(No Model.)
J. WATEROUS.
REIN GUARD FOR VEHICLES.
No. 360,495. Patented Apr. 5, 1887.
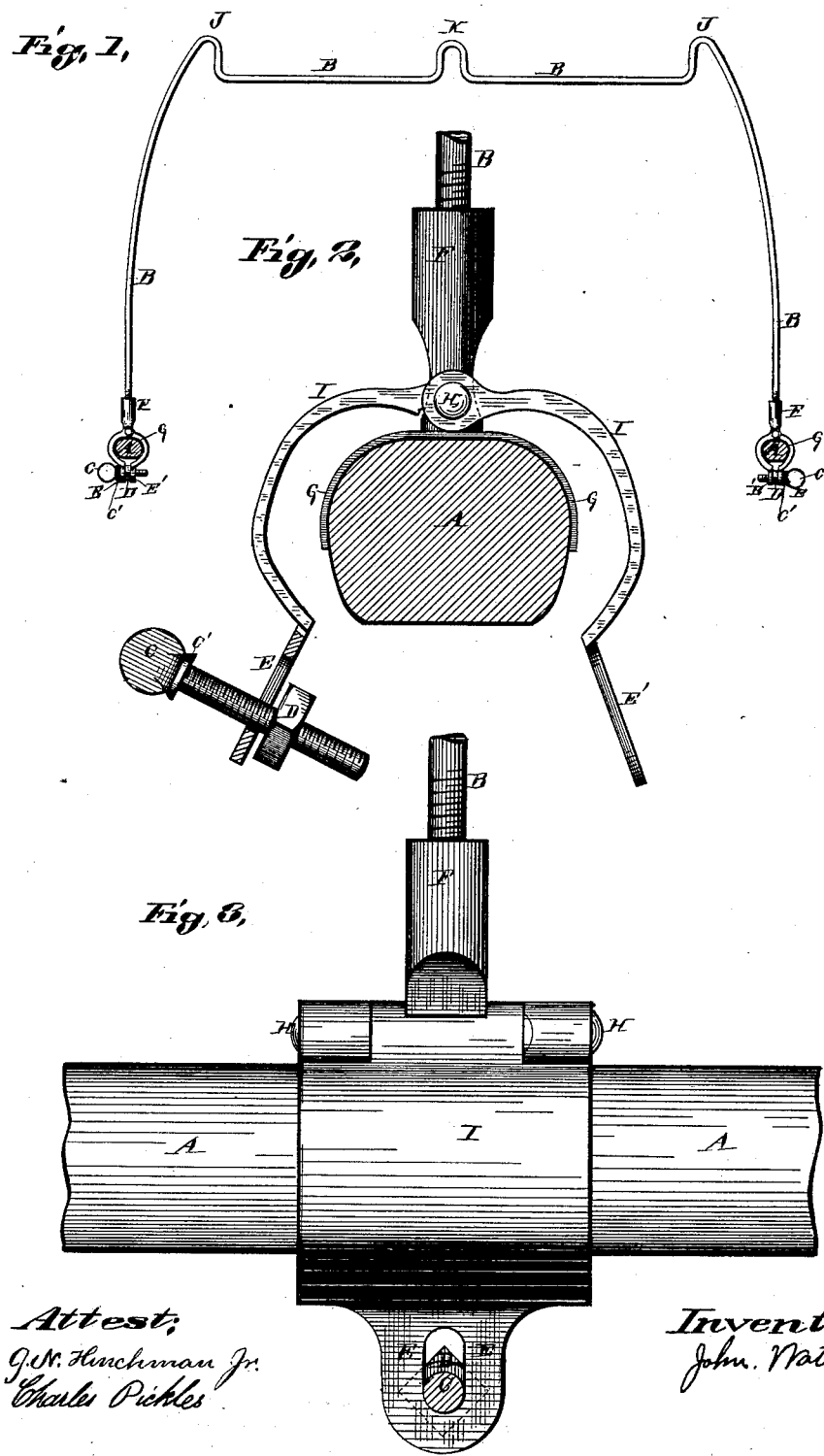
Attest:
G. N. Hinchman Jr.
Charles Pickles
Inventor:
John Waterous
N. PETERS, Photo-Lithographer, Washington, D. C.

UNITED STATES PATENT OFFICE.

JOHN WATEROUS, OF ST. LOUIS, MISSOURI.

REIN-GUARD FOR VEHICLES.

SPECIFICATION forming part of Letters Patent No. 360,495, dated April 5, 1887.

Application filed September 28, 1886. Serial No. 214,798. (No model.)

*To all whom it may concern:*

Be it known that I, JOHN WATEROUS, a citizen of the United States, residing at St. Louis, in the State of Missouri, have invented a new and useful Clamp and Safety Rein-Guard, of which the following is a specification.

My invention relates to an improvement in the shape of rein-guards and the method of fastening them to the shafts of buggies, in which the rod which supports the driving-reins and connects the two shafts of a buggy is fastened to a clamp on each shaft by screwing its ends into the upright socket of the clamp, which can be put on the shafts and removed at pleasure without in any manner injuring them.

Some method of keeping the driving-reins from getting under the tail of the horse has long been needed, but heretofore rein-guards have been fastened permanently to the buggy-shafts by using screws, or other impracticable methods. Where screws are put into the shafts they weaken them, besides being very inconvenient to remove, and they have not been generally adapted to different-sized horses.

The rein-guard I have invented is easily put on and removed, and can be used upon different-sized shafts. The rod connecting the shafts is of different heights, so as to be used with small and large horses. The guard I have here shown does not weaken the shafts, or mar the paint upon them even. All of these objects I obtain by the mechanism illustrated in the following drawings, in which—

Figure 1 is an elevation of the device as it appears when attached to the shafts of a buggy. Fig. 2 is a front view of the clamp, partially open, showing the shaft in the center surrounded with a leather washer or other soft substance. Fig. 3 is a side view of clamp with thumb screw in section.

Similar letters refer to similar parts throughout the several views.

A represents the buggy-shaft or tongue of a wagon; G, the soft washer surrounding it to keep the clamp from scratching or marring the paint; B, the metal rod extending from one shaft to the other and high enough back of the horse to be out of the way of his tail, and screwing at each end into the socket F. The rod B is made of different heights, so as to be changed for different-sized horses. The ends of the rod B are necessarily screwed into the socket F before the clamps are attached to the shafts.

J is the crook in the rod at each side to keep the reins from slipping off the rod-support.

H is the center-pin, running through the top of the swiveled sides I and the upright socket F, holding them firmly together, yet allowing the sides to open and shut like a hinge. The socket F rests firmly upon the shaft.

E and E' are the lugs, E having a slot allowing the thumb-screw C to move up and down to adjust itself as the screw brings the lugs together while it screws into E'.

D is the jam-nut between the lugs, used to keep the bolt or screw from slipping out of the slot when the screw is not in E'.

It will be seen that this clamp is so constructed as to fit on different-sized shafts where the variations in size is not great. When considerable difference in size is found—as in express-wagons—a larger-sized clamp is used. When the clamp is screwed together tight, the shoulder c' of the screw presses against the lug E, and the swiveled sides I firmly clasp the sides of the shaft, thus rather strengthening them.

Now what I claim as my invention, and desire to secure by Letters Patent, is—

1. The combination of the adjustable metal clamp, as herein described, having an upright socket, F, resting firmly upon the shaft, fastened to the swiveled sides I by the center-pin H, and holding the shaft firmly by means of the thumb-screw C, which also regulates it to different-sized shafts, with the washer G, of leather or other soft substance, to protect the paint from marring.

2. The combination, in a rein-guard, of the rod B, made of the shape herein shown, with the raised curve J at each side and screwing into the socket F, as herein described.

JOHN WATEROUS.

Witnesses:
R. B. SINGLETON,
JAS. D. EVERLEND.